(12) United States Patent
Chang et al.

(10) Patent No.: US 8,125,976 B2
(45) Date of Patent: Feb. 28, 2012

(54) APPARATUS FOR GENERATING DOWN LINK SIGNAL, AND METHOD AND APPARATUS FOR CELL SEARCH IN CELLULAR SYSTEM

(75) Inventors: Kap-Seok Chang, Daejeon (KR); Il-Gyu Kim, Daejeon (KR); Nam-Il Kim, Daejeon (KR); Young-Hoon Kim, Daejeon (KR); Seung-Chan Bang, Daejeon (KR)

(73) Assignees: Electronics and Telecommunications Research Institute, Daejeon (KR); SK Telecom., Co., Ltd., Seoul (KR); KT Corporation, Seongnam (KR)

( * ) Notice: Subject to any disclaimer, the term of this patent is extended or adjusted under 35 U.S.C. 154(b) by 58 days.

(21) Appl. No.: 12/159,946

(22) PCT Filed: May 25, 2007

(86) PCT No.: PCT/KR2007/002556
§ 371 (c)(1),
(2), (4) Date: Jul. 2, 2008

(87) PCT Pub. No.: WO2008/026819
PCT Pub. Date: Mar. 6, 2008

(65) Prior Publication Data
US 2009/0161652 A1    Jun. 25, 2009

(30) Foreign Application Priority Data
Aug. 28, 2006  (KR) ........................ 10-2006-0081763

(51) Int. Cl.
*H04J 3/06* (2006.01)

(52) U.S. Cl. ........ 370/350; 370/503; 370/509; 370/510; 370/511; 370/513; 370/514; 370/520; 455/502

(58) Field of Classification Search ............ 370/203, 370/208, 320, 335, 341, 342, 350, 328, 503, 370/508, 509, 510, 312, 514, 520, 209, 329, 370/512, 513; 455/502, 524, 525, 515
See application file for complete search history.

(56) References Cited

U.S. PATENT DOCUMENTS
4,004,100 A * 1/1977 Takimoto ...................... 370/515
(Continued)

FOREIGN PATENT DOCUMENTS
CN          1613208 A      5/2005
(Continued)

OTHER PUBLICATIONS
International Search Report for PCT/KR2007/002556 dated Sep. 4, 2007.
(Continued)

*Primary Examiner* — Olumide T Ajibade Akonai
(74) *Attorney, Agent, or Firm* — Kile Park Goekjian Reed & McManus PLLC (57) ABSTRACT

The invention provides a method of generating a downlink signal and searching a cell on the basis of the downlink signal in an OFDM-based cellular system. The downlink signal includes a plurality of synchronization blocks each having a plurality of sub-frames, and a synchronization pattern composed of a combination of a cell group identification code for identifying a cell group and a frame synchronization identification code for indicating a frame start point is generated in each of the synchronization blocks. Different frame synchronization identification codes are allocated to the synchronization blocks.

22 Claims, 7 Drawing Sheets

U.S. PATENT DOCUMENTS

| | | |
|---|---|---|
| 6,363,060 B1 * | 3/2002 | Sarkar ........................... 370/342 |
| 6,847,630 B2 * | 1/2005 | Blanz et al. .................... 370/350 |
| 6,912,258 B2 | 6/2005 | Birru |
| 7,012,881 B2 | 3/2006 | Kim |
| 7,386,055 B2 * | 6/2008 | Morita et al. ................. 375/260 |
| 7,675,846 B2 * | 3/2010 | Lindoff et al. ................ 370/210 |
| 7,738,437 B2 * | 6/2010 | Ma et al. ....................... 370/342 |
| 2005/0111522 A1 | 5/2005 | Sung et al. |
| 2005/0226141 A1 | 10/2005 | Ro et al. |
| 2005/0265293 A1 | 12/2005 | Ro et al. |
| 2008/0019350 A1 * | 1/2008 | Onggosanusi et al. ....... 370/350 |
| 2008/0043858 A1 | 2/2008 | Lim et al. |

FOREIGN PATENT DOCUMENTS

| | | |
|---|---|---|
| EP | 1 453 232 A1 | 9/2004 |
| JP | 2005-159973 | 6/2005 |
| KR | 10-2001-0060027 A | 7/2001 |
| KR | 10-2002-0049491 | 6/2002 |
| KR | 10-2002-0056807 | 7/2002 |
| KR | 10-2005-0041857 A | 5/2005 |
| KR | 10-2005-0062636 A | 6/2005 |
| KR | 10-2005-0066562 | 6/2005 |
| KR | 10-2005-0099163 | 10/2005 |
| KR | 10-2006-0015188 | 2/2006 |
| WO | 03/043229 A1 | 5/2003 |

OTHER PUBLICATIONS

Jongnam Kim et al., "New Preamble Structures for Synchronization and Cell Searching in OFDM Systems", IEEE, 2005, pp. 1623-1627.

* cited by examiner

APPARATUS FOR GENERATING DOWN LINK SIGNAL, AND METHOD AND APPARATUS FOR CELL SEARCH IN CELLULAR SYSTEM

TECHNICAL FIELD

The present invention relates to a method and apparatus for generating a downlink signal in a cellular system, and more particularly, to a method of searching a downlink cell in an orthogonal frequency division multiplexing (OFDM)-based cellular system.

BACKGROUND ART

In a cellular system, for initial synchronization, a terminal should acquire timing synchronization and frequency synchronization on the basis of signals transmitted from a base station, and perform a cell search. After the initial synchronization, the terminal should track the timing and frequency, and perform the timing and frequency synchronization between adjacent cells and the cell search in order for handover.

In a synchronous cellular system, all base stations can perform frame synchronization using common time information from an external system. However, a cellular system that has been developed by 3GPP (3rd generation partnership project) is an asynchronous system in which the frame timings of all base stations are independent. The asynchronous cellular system needs to perform a cell search process, unlike the synchronous cellular system.

Therefore, a method of acquiring synchronization using a separate preamble and searching a cell has been proposed. However, the method cannot be applied to a system without the preamble. In addition, a method of acquiring synchronization and searching a cell using pilot symbols disposed at start and end points of a sub-frame has been proposed. However, the method has a problem in that a large number of pilots should be used.

DISCLOSURE

Technical Problem

The present invention has been made in an effort to provide a cell searching method and apparatus that are capable of forming a plurality of synchronization channels in one frame to effectively acquire synchronization and search a cell in an OFDM-based cellular system.

Technical Solution

In order to achieve the object, according to an exemplary embodiment of the present invention, there is provided an apparatus for generating a downlink signal in an orthogonal frequency division multiplexing (OFDM)-based cellular system. The downlink signal generating apparatus includes a pattern generator and a time-frequency mapping unit. The pattern generator generates synchronization patterns for a plurality of synchronization blocks forming one frame of the downlink signal, and the synchronization blocks each have a continuous series of sub-frames. The synchronization pattern includes a cell group number and information on a start point of the frame. The time-frequency mapping unit maps the synchronization patterns to a time-frequency domain to generate the downlink signal.

According to another exemplary embodiment of the present invention, there is provided an apparatus for searching a cell including a terminal in an orthogonal frequency division multiplexing (OFDM)-based cellular system. The cell searching apparatus includes a receiver and first to third estimators. The receiver receives one frame of synchronization blocks. Each of the synchronization blocks has a plurality of adjacent sub-frames, and a plurality of OFDM symbols of the synchronization block each have a synchronization pattern that is composed of a combination of a cell group identification code for identifying a cell group and a frame synchronization identification code for indicating a frame start point. The combination of the cell group identification code and the frame synchronization identification code is referred to as a combination of codes. The first estimator estimates a start point of the synchronization block from the synchronization pattern. The second estimator estimates the frame start point and a cell group number of the cell group to which the cell including the terminal belongs, using the start point of the synchronization block. The third estimator estimates a cell number of the cell including the terminal, using a cell identification scrambling code included in a pilot symbol of the frame.

According to still another exemplary embodiment of the invention, there is provided a method of searching a cell including a terminal in an orthogonal frequency division multiplexing (OFDM)-based cellular system. First, a downlink frame including a plurality of synchronization blocks, each having a synchronization pattern that is composed of a combination of a cell group identification code for identifying a cell group including the terminal and a frame synchronization identification code for indicating a start portion of the frame (a combination of codes), is received, and a start point of the synchronization block is estimated in the received downlink frame. Then, a cell group number and frame synchronization are acquired from the estimated start point of the synchronization block and the synchronization pattern, and a cell number is acquired from a cell identification scrambling code included in the downlink frame.

MODE FOR INVENTION

In the following detailed description, only certain exemplary embodiments of the present invention have been shown and described, simply by way of illustration. However, the present invention is not limited to the following exemplary embodiments, but various modifications and changes of the invention can be made. Accordingly, the drawings and description are to be regarded as illustrative in nature and not restrictive. Like reference numerals designate like elements throughout the specification.

It will be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a method and apparatus for generating a downlink signal and a method and apparatus for searching a cell in a cellular system according to exemplary embodiments of the present invention will be described in detail with reference to the accompanying drawings.

Figure 1:
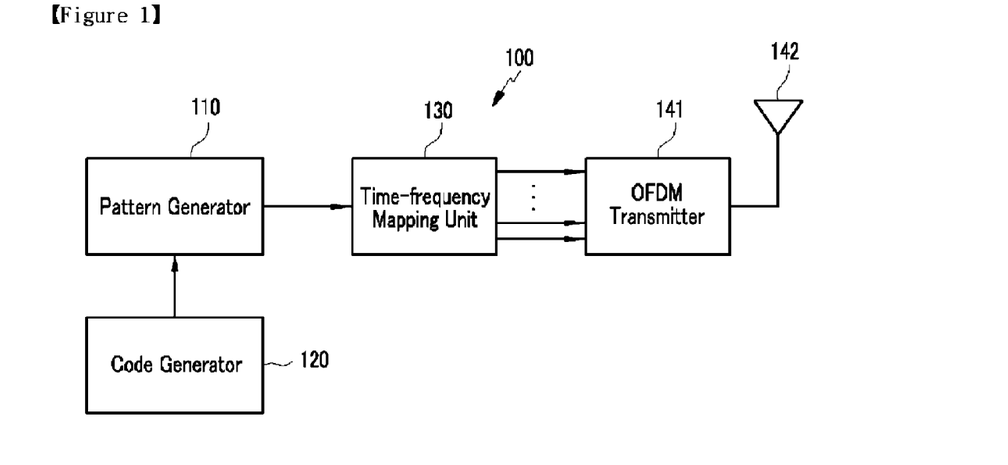
FIG. 1 is a block diagram schematically illustrating an apparatus for generating a downlink signal in a cellular system according to an exemplary embodiment of the present invention.
Figure 2:
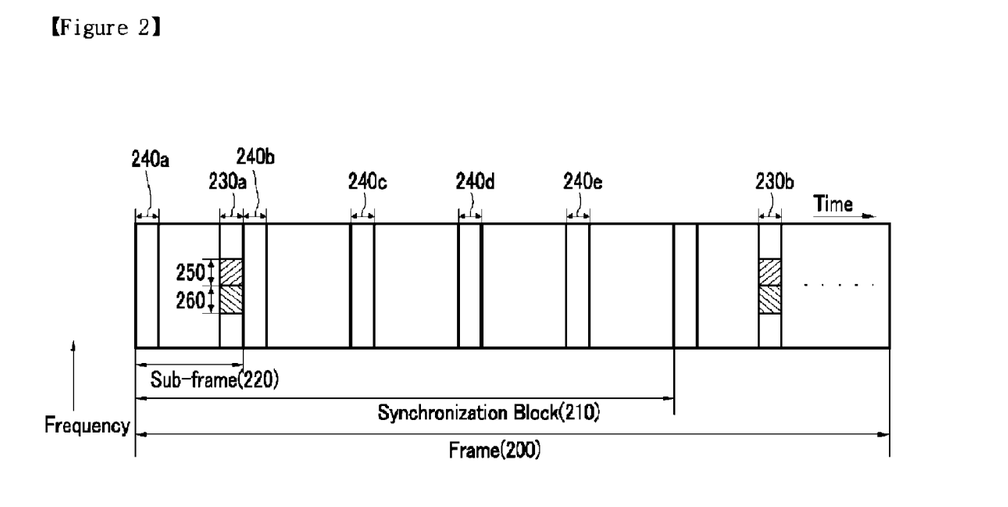
FIG. 2 is a diagram illustrating the configuration of a downlink frame of the cellular system according to the exemplary embodiment of the present invention.

FIG. 1 is a block diagram schematically illustrating an apparatus for generating a downlink signal in a cellular system according to an exemplary embodiment of the present invention, and FIG. 2 is a diagram illustrating a downlink frame structure of a cellular system according to an exemplary embodiment of the present invention.

As shown in FIG. 1, a downlink signal generating apparatus 100 according to an exemplary embodiment of the present invention includes a pattern generator 110, a code generator 120, a time-frequency mapping unit 130, an OFDM transmitter 141, and a transmitting antenna 142, and is provided in a base station (not shown) of the cellular system. As shown in FIG. 2, the downlink signal generated by the downlink signal generating apparatus 100 according to the exemplary embodiment of the present invention includes a plurality of synchronization blocks 210, and each of the synchronization blocks 210 includes a plurality of sub-frames 220. Information for identifying a cell group and information for estimating frame synchronization are allocated to first symbol durations 230a and 230b of each synchronization block 210. In addition, different frame synchronization identification codes are allocated to the synchronization blocks 210.

The pattern generator 110 generates a synchronization pattern and a pilot pattern of the downlink signal using a set of orthogonal codes indicating cell number information, cell group information, and information for identifying frame synchronization. The pattern generator 110 allocates a series of orthogonal codes to a cell group number for identifying a cell group, and uses the series of orthogonal codes to recognize a frame start point. Hereinafter, for better comprehension and ease of description, the orthogonal codes allocated to the cell group numbers are referred to as "cell group identification codes," and the orthogonal codes used to recognize the frame start points are referred to as "frame synchronization identification codes." The pattern generator 120 matches the cell group identification codes with the frame synchronization identification codes to generate a set of codes, and allocates the set of codes to a frequency domain of a synchronization channel symbol duration of the downlink signal to generate a synchronization pattern of the downlink signal. The pattern generator 110 allocates to a pilot channel symbol duration a unique scrambling code that is allocated to each cell in order to encode a common pilot symbol and a data symbol in the cellular system, thereby generating a pilot pattern of the downlink signal.

The code generator 120 generates orthogonal code sets that are used as the cell group identification codes and the frame synchronization identification codes, and transmits the generated orthogonal code sets to the pattern generator 110. Then, the pattern generator 110 uses the orthogonal code sets to generate a synchronization pattern and a pilot pattern.

The time-frequency mapping unit 130 maps data to a time-frequency domain, using the synchronization pattern information and the pilot pattern information generated by the pattern generator 110, and frame structure information and transmission traffic data that are transmitted from the outside, to form a frame of downlink signals (reference numeral 200 in FIG. 2).

Then, the OFDM transmitter 141 receives the downlink signal from the time-frequency mapping unit 130, and transmits the signal through the transmitting antenna 142.

Referring to FIG. 2, one frame 200 of downlink signals in a cellular system according to an exemplary embodiment of the present invention is composed of Nsync synchronization blocks 210, and each of the synchronization blocks 210 includes Nsub sub-frames 220. An OFDM symbol duration 230a of the downlink signal uses Nt subcarriers each having a frequency range of Δf. Pilot symbol durations 240a to 240e, each having pilot data therein, are formed in the headers of the sub-frames 220 forming one synchronization block 210. A first sub-frame of the synchronization block 210 is provided with synchronization symbol durations 230a and 230b each having data including a cell group identification code and a frame synchronization identification code arranged therein. The synchronization symbol durations 230a and 230b may be disposed in a first OFDM symbol duration of the first sub-frame or the last OFDM symbol duration of the first sub-frame. Each of the synchronization symbol durations 230a and 230b is divided into two frequency bands 250 and 260 in the frequency domain, and each of the frequency bands 250 and 260 has the cell group identification code and the synchronization identification code inserted therein. As shown in FIG. 2, the pattern generator 110 does not form a synchronization pattern in the entire frequency domain of each of the symbol durations 230a and 230b, but allocates codes to only a central portion of the frequency bandwidth except a DC subcarrier to form the synchronization pattern in the central portion. In a 3GPP system, the downlink frame 200 includes 20 sub-frames 220, and one sub-frame 220 corresponds to a time of 0.5 msec. In the case of unicast transmission, one sub-frame 220 includes 7 OFDM symbol durations, and in the case of multicast transmission, one sub-frame 220 includes 6 OFDM symbol durations. In the downlink frame of the 3GPP system, as an example, the synchronization block 210 may include 5 sub-frames 220. In this case, one frame includes four synchronization channel symbol durations.

Next, the generation of the synchronization pattern and the pilot pattern by the pattern generator 110 shown in FIG. 1 will be described in detail with reference to FIGS. 3 and 4.

Figure 3:
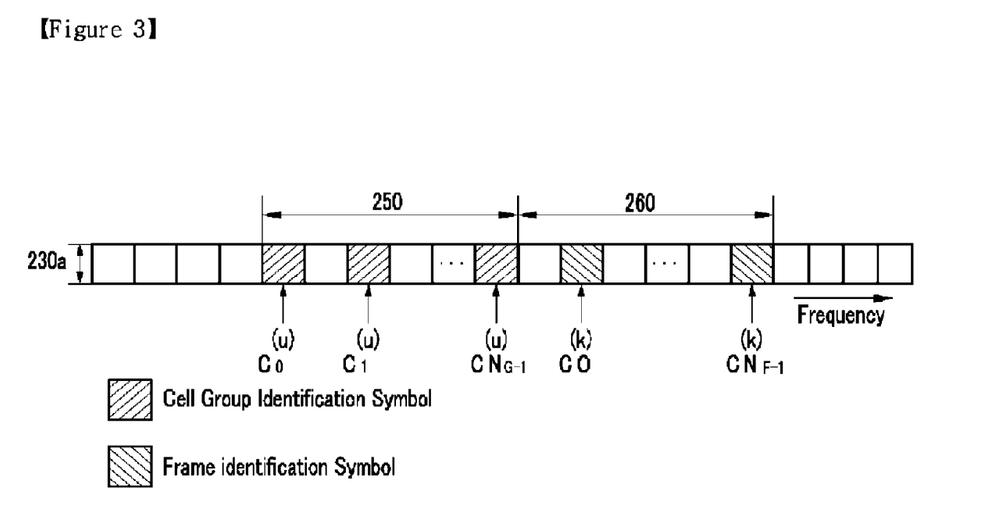
FIG. 3 is a diagram illustrating the detailed configuration of the downlink frame shown in FIG. 2.
Figure 4:
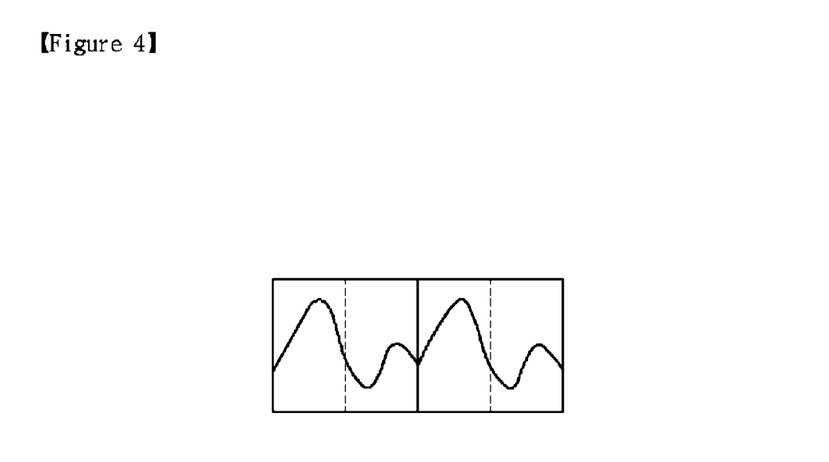
FIG. 4 is a diagram illustrating a signal waveform obtained by converting the downlink frame shown in FIG. 3 into a time domain.

FIG. 3 is a diagram illustrating the OFDM symbols in the synchronization channel symbol duration in which the synchronization pattern is formed, and FIG. 4 is a diagram illustrating a signal waveform when the synchronization channel symbol duration shown in FIG. 3 is converted into a time domain.

As shown in FIG. 3, the pattern generator 110 divides a predetermined bandwidth into a frequency band 250 for inserting the cell group identification code and a frequency band 260 for inserting the frame synchronization identification code on the basis of a central subcarrier in the entire frequency bandwidth of the channel symbol duration 230a, and sequentially inserts orthogonal codes into the divided frequency bands to form the synchronization pattern. The pattern generator 110 allocates to the frequency bands 250 and 260 the orthogonal codes in two independent orthogonal code sets transmitted from the code generator 120. Referring to FIG. 3, the pattern generator 110 allocates an
orthogonal code set of
and an orthogonal code set of
to the frequency band 250 for identifying a cell group and the frequency band 260 for identifying frame synchronization to form the synchronization pattern, respectively. In this case, "k" indicates a cell group number, "u" indicates a frame synchronization identification code number, "NG" indicates the length of the cell group identification code, and "NF" indicates the length of the frame synchronization identification code. The pattern generator 110 according to the exemplary embodiment of the present invention may use GCL (generalized chirp-like) codes as the cell group identification code and the frame synchronization identification code, and these codes can be expressed by the following Equations 1 and 2:

$$c_n^{(k)} = \exp\left\{-j2\pi k \frac{n(n+1)}{2N_G}\right\}, \quad \text{(Equation 1)}$$
$$n = 0, 1, \ldots, N_G - 1,$$
and
$$c_n^{(u)} = \exp\left\{-j2\pi u \frac{n(n+1)}{2N_F}\right\}, \quad \text{(Equation 2)}$$
$$n = 0, 1, \ldots, N_F - 1.$$

The orthogonal codes expressed by Equations 1 and Equation 2 are allocated to the positions shown in FIG. 3 to generate the synchronization pattern. That is, the pattern generator 110 does not sequentially allocate the orthogonal codes obtained by Equations 1 and 2 to adjacent subcarriers, but allocates even-numbered subcarriers or odd-numbered subcarriers in the frequency bands 250 and 260. Subcarriers between the subcarriers having the orthogonal codes allocated thereto are used as nulling subcarriers to which no sequence is allocated. Therefore, the subcarriers including the nulling carriers that are arranged in the synchronization channel symbol duration for forming the pattern occupy substantially 2*[(NG+NF)+NB] (hereinafter, referred to as NS) subcarrier bands. In this case, "NB" indicates the number of subcarriers in a guard band.

When the synchronization pattern is converted into a time domain, the signal waveform shown in FIG. 4 is obtained. FIG. 4 shows the signal waveform of the OFDM symbol except a cyclic prefix. As can be seen from FIG. 4, two repeated patterns are generated in the time domain due to two kinds of inserted orthogonal codes.

As shown in FIG. 3, the downlink signal generating apparatus 100 according to the exemplary embodiment of the present invention forms a synchronization pattern such that one nulling subcarrier exists between the subcarriers to which sequences are allocated over the frequency domain of the synchronization channel symbol duration in which the cell group identification code and the synchronization identification code are allocated, thereby generating signals. Therefore, the generated signal has the repeated pattern shown in FIG. 4, and a terminal having received the downlink frame acquires initial symbol synchronization and estimates a frequency offset, using the signal pattern shown in FIG. 4.

The lengths NG and NF of the cell group identification code and the synchronization identification code inserted into each of the synchronization channel symbol durations of the downlink frame may be different from each other, and information on the lengths of these identification codes and information on the synchronization patterns thereof are shared by a terminal and a base station.

The terminal having received the downlink frame 200 having the synchronization pattern shown in FIG. 3 demodulates the two frequency bands 250 and 260 for each synchronization block to obtain information on the cell group number and the frame start point, which makes it possible to rapidly and effectively search the cells. In addition, the frequency domain of the channel symbol duration is divided into two frequency bands, and the same sequence or different types of sequences are allocated to the two divided frequency bands, which makes it possible to prevent the lowering of a correlation performance due to the selective fading of frequencies.

In the exemplary embodiment of the present invention, the cell group identification code is inserted before the frame synchronization identification code on a frequency axis of the synchronization channel symbol duration, but the invention is not limited thereto. For example, the cell group identification code may be inserted after the frame synchronization identification code to form the synchronization pattern. Further, in the exemplary embodiment of the present invention, the same type of orthogonal code is used as the cell group identification code and the frame synchronization identification code, but the invention is not limited thereto. For example, different types of orthogonal codes may be used as the cell group identification code and the frame synchronization identification code. In this case, general orthogonal codes, such as a Hadamard code, a KAZAC code, a gold code, a Golay code, and a pseudo-noise (PN) code, may be used as the identification codes.

Figure 5:
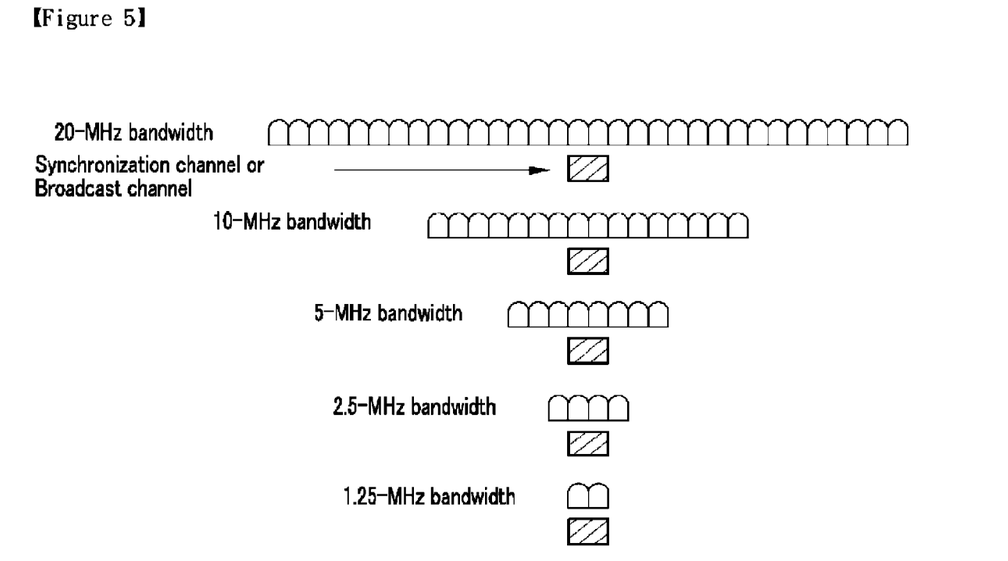
FIG. 5 is a diagram illustrating the bandwidth scalability of the downlink frame according to the exemplary embodiment of the present invention.
Figure 6:
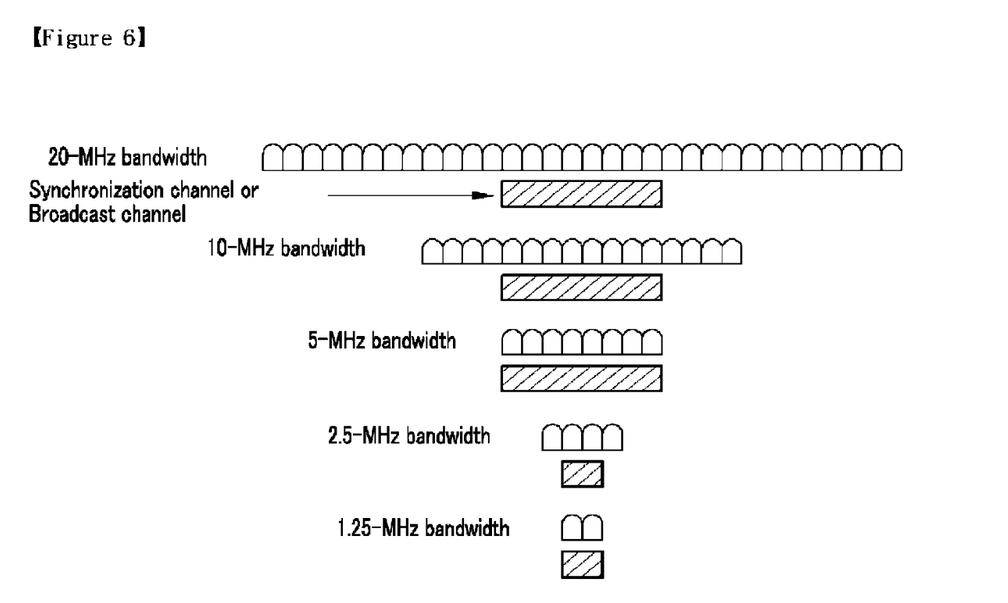
FIG. 6 is a diagram illustrating the bandwidth scalability of a downlink frame according to another exemplary embodiment of the present invention.

FIG. 5 is a diagram illustrating the bandwidth scalability of a downlink frame according to an exemplary embodiment of the present invention, and FIG. 6 is a diagram illustrating the bandwidth scalability of a downlink frame according to another exemplary embodiment of the present invention.

FIGS. 5 and 6 show the comparison between the bandwidth of the synchronization channel symbol duration shown in FIG. 3 with the entire bandwidth supported by the cellular system. As shown in FIGS. 2 and 3, the downlink signal generating apparatus 100 according to the exemplary embodiment of the present invention inserts orthogonal codes into the center of the frequency bandwidth to generate a synchronization pattern. In the cellular system, since the terminals have different supportable bandwidths according to their levels, it is possible to support the bandwidth scalability of the terminals through the frame structure. FIG. 5 shows a synchronization pattern allocated to a 1.25 MHz band within the frequency bandwidth. Traffic data cannot be allocated to an OFDM symbol without a synchronization pattern in the channel symbol duration, and transmitted thereto. FIG. 6 shows a synchronization pattern allocated to a 1.25 MHz band or a 5 MHz band within the frequency bandwidth. A terminal supporting a 5 MHz band or more can receive all synchronization patterns transmitted, but terminals supporting a 1.25 MHz band and a 2.5 MHz band can receive some synchronization patterns that are arranged in the center of the frequency bandwidth. According to the exemplary embodiment of the present invention, it is possible to extract the cell group number and information on the synchronization start point from the downlink frame using only some of the received synchronization patterns, and thus support the bandwidth scalability.

Next, a method of allowing a terminal to search a cell using the downlink signal will be described in detail below with reference to FIGS. 7 and 8.

Figure 7:
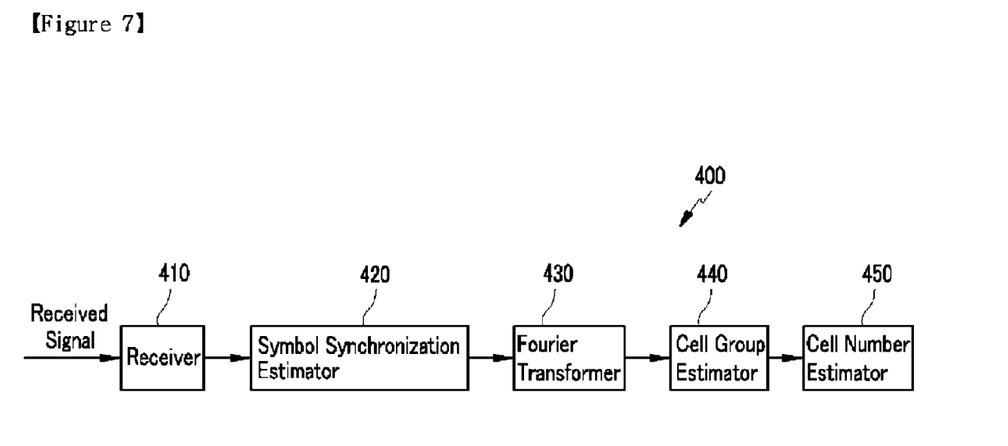
FIG. 7 is a block diagram schematically illustrating a cell searching apparatus according to an exemplary embodiment of the present invention.
Figure 8:
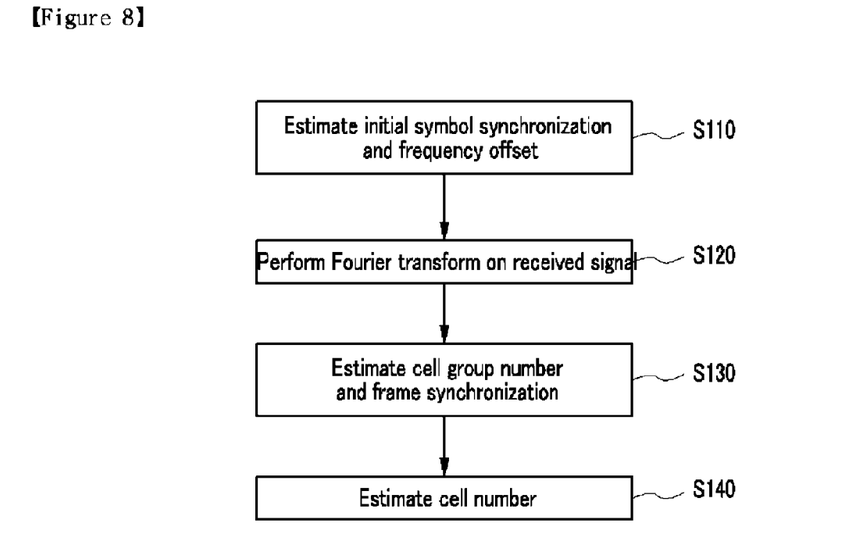
FIG. 8 is a flowchart illustrating a cell searching method according to an exemplary embodiment of the present invention.

FIG. 7 is a block diagram schematically illustrating a cell searching apparatus according to an exemplary embodiment of the present invention, and FIG. 8 is a flowchart illustrating a cell searching method according to an exemplary embodiment of the present invention.

Referring to FIG. 7, a cell searching apparatus 400 according to an exemplary embodiment of the present invention includes a receiver 410, a symbol synchronization estimator 420, a Fourier transformer 430, a cell group estimator 440, and a cell number estimator 450. The Fourier transformer 430 can perform fast Fourier transform (FFT).

As shown in FIG. 8, the receiver 410 receives signals transmitted from a base station. The symbol synchronization estimator 420 filters the received signal within the bandwidth allocated to a synchronization channel, removes a guard interval, performs differential correlation to acquire symbol synchronization or sub-frame synchronization, and estimates a frequency offset (S110). Then, the Fourier transformer 430 performs Fourier transform on the received signal on the basis of the symbol synchronization estimated by the symbol synchronization estimator 420 (S120). The cell group estimator 440 estimates a frame start point from the sequence of the synchronization channel symbol duration included in the received signal that has been subjected to Fourier transform, acquires frame synchronization, and estimates the cell group number (S130). The cell number estimator 440 estimates the cell number using scrambling code information included in the pilot symbol duration (S140).

Next, the acquisition of sub-frame synchronization and the estimation of a frequency offset by the symbol synchronization estimator 420 will be described in detail with reference to FIG. 9.

Figure 9:
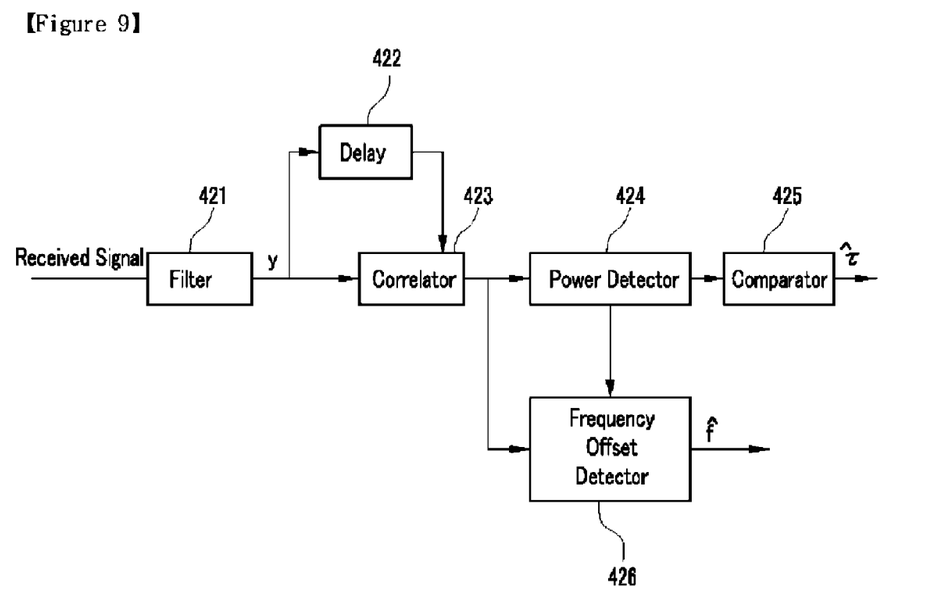
FIG. 9 is a block diagram schematically illustrating the configuration of a synchronization estimator according to an exemplary embodiment of the present invention.

FIG. 9 is a block diagram schematically illustrating the structure of the symbol synchronization estimator 420 according to an exemplary embodiment of the present invention.

Referring to FIG. 9, the symbol synchronization estimator 420 according to the exemplary embodiment of the present invention includes a filter 421, a delay unit 422, a correlator 423, a power detector 424, a comparator 425, and a frequency offset detector 426.

The symbol synchronization estimator 420 estimates sub-frame synchronization and frequency offset from a received signal having the time domain signal waveform shown in FIG. 4 in the synchronization channel symbol duration. The symbol synchronization estimator 420 may estimate the last OFDM symbol duration of the sub-frame where the synchronization pattern is formed and a frequency offset in the last OFDM symbol duration.

The filter 421 filters the time domain signal within a bandwidth allocated to the synchronization channel and removes a guard interval to extract signals y(n+l) in NS subcarrier bands, which are central subcarrier bands, in which the synchronization patterns are formed in the entire frequency band corresponding to the synchronization channel symbol duration. The filter 421 can perform bandpass filtering. The length of the signal y(n+l) output from the filter 421 corresponds to NS.

The delay unit 422 delays the filtered signal y(n+l) by a time corresponding to half the effective symbol length NS. The correlator 423 performs differential correlation on the input signal y(n+l) and an output signal y(n+l+Ns/2) of the delay unit 422 in a sample duration corresponding to half the effective symbol length. The differential correction performed by the correlator 423 can be expressed by Equation 3 given below:

$$Y = \sum_{l=0}^{1/2N_S - 1} y(n+l) y*\left(n + l + \frac{1}{2}N_S\right).$$  (Equation 3)

The power detector 424 having received the correlation result Y calculated by Equation 3 calculates a differential correlation value of the received signal, that is, the power of the received signal. The comparator 425 selects the time when the power detector 424 outputs a maximum value by Equation 4 given below, and sets the selected time as an initial symbol synchronization time.

$$\hat{\tau} = \max_{l}\{|Y|^2\}.$$  (Equation 4)

The frequency offset detector 426 estimates an initial frequency offset.

In this exemplary embodiment of the present invention, differential correlation is performed on only the time domain signals corresponding to one synchronization channel symbol duration to detect the initial symbol synchronization and the frequency offset, but the invention is not limited thereto. For example, the time domain signals in a different synchronization channel symbol duration in one downlink frame may be accumulated, and the differential correlation may be performed on the accumulated signals. In addition, in order to improve an estimating performance, data obtained from synchronization patterns of a plurality of frames may be accumulated, and the differential correlation may be performed on the accumulated data.

The Fourier transformer 430 performs Fourier transform on the received signal on the basis of sub-frame synchronization estimated by the symbol synchronization estimator 420.

The estimation of the frame synchronization and the cell group number by the cell group estimator 440 from the synchronization pattern of the signal that has been subjected to Fourier transform will be described in detail below with reference to FIGS. 10 to 12. First, referring to FIGS. 10 and 11, a method of generating the synchronization pattern of the downlink frame and estimating the cell group number and frame synchronization from the generated synchronization pattern will be described with reference to FIG. 12.

Figure 10:
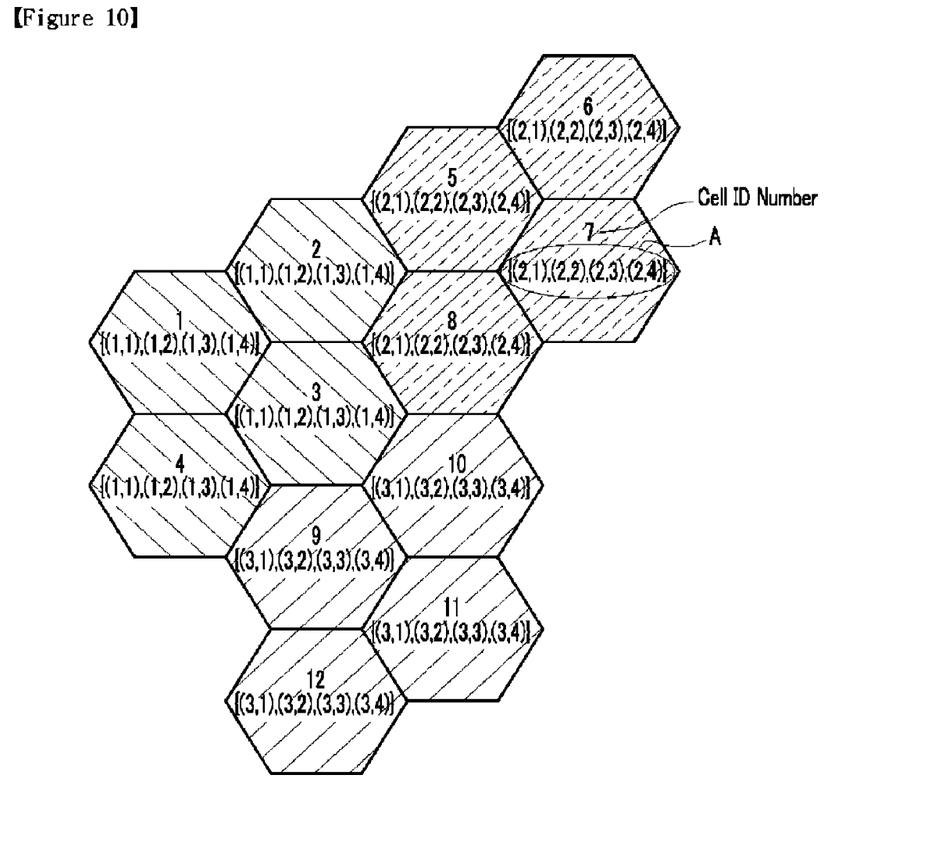
FIG. 10 is a diagram illustrating a method of allocating a cell group identification code and a frame synchronization identification code according to an exemplary embodiment of the present invention.
Figure 11:
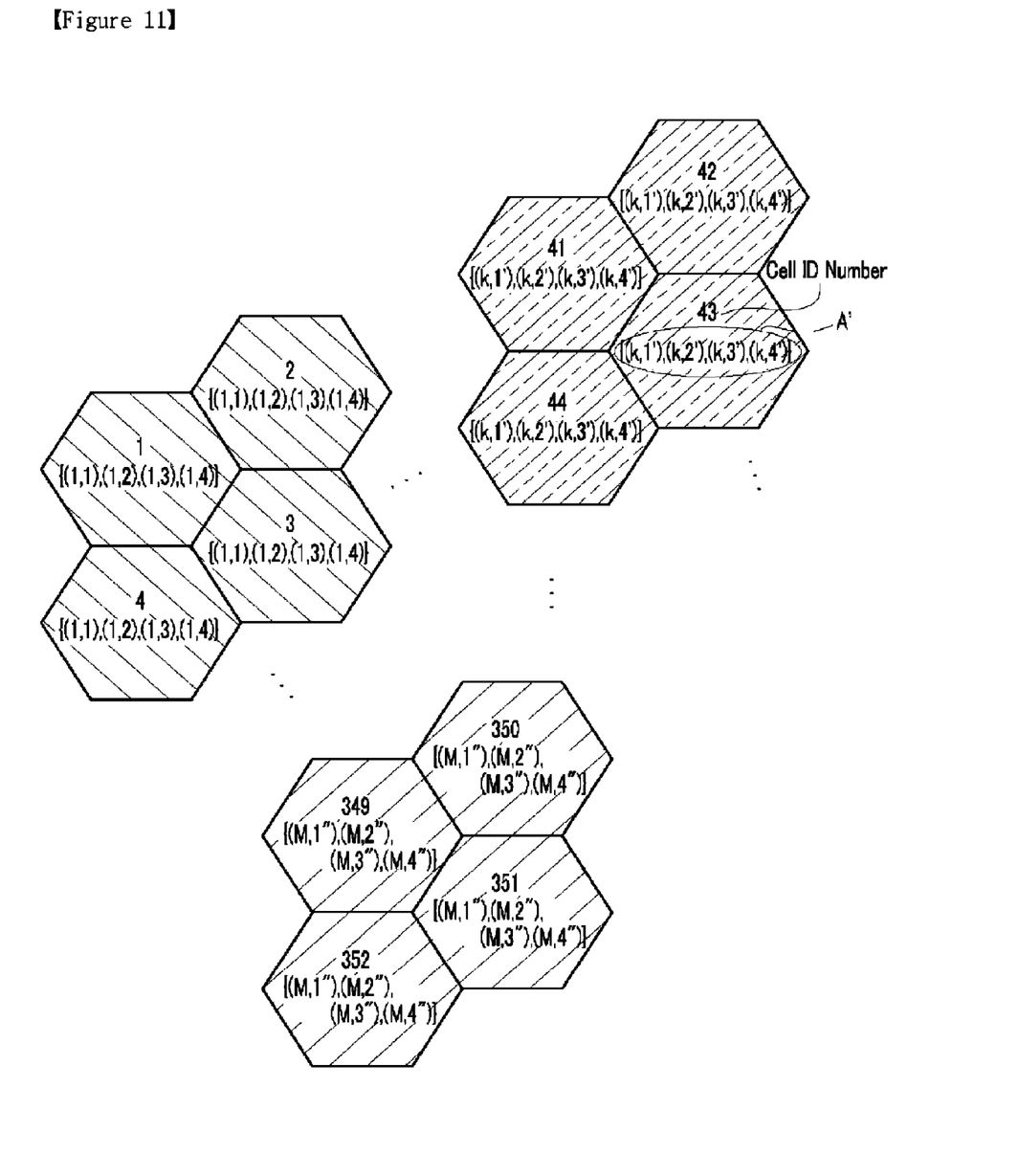
FIG. 11 is a diagram illustrating a method of allocating a cell group identification code and a frame synchronization identification code according to another exemplary embodiment of the present invention.

FIGS. 10 and 11 are diagrams illustrating a method of allocating the synchronization pattern shown in FIG. 3. The downlink generating apparatus according to the exemplary embodiment of the present invention combines a cell group identification code C(k) with a frame synchronization identification code C(u) to generate a synchronization pattern. FIGS. 10 and 11 show combinations of the cell group identification codes and the frame synchronization identification codes in the form of (k, u) (A in FIG. 10 and A' in FIG. 11). In FIGS. 10 and 11, it is assumed that a frame 200 of downlink signals includes 4 synchronization blocks 210.

FIG. 10 shows a synchronization pattern generated by combining orthogonal codes using only common frame synchronization identification codes C(1), C(2), C(3), and C(4) to all cell groups in the cellular system. In FIG. 10, cell No. 1 to cell No. 4 form cell group No. 1, cell No. 5 to cell No. 8 form cell group No. 2, and cell No. 9 to cell No. 12 form cell group No. 3. FIG. 10 shows a combination of codes when C(k) (k is cell group number, k=1, 2, 3, . . . ) is used as the cell group identification code. When the synchronization pattern is formed as shown in FIG. 10, the same frame synchronization identification code is transmitted from all cells. Therefore, it is possible to obtain a macro diversity gain. That is, the terminal having received the downlink frame performs correlation on a synchronization channel symbol duration to detect a frame synchronization identification code, in order to acquire the frame synchronization. In this case, since the same code is used for all cells, a correlation characteristic is improved, and thus a frame synchronization acquiring performance can be improved. In this case, the number of cell groups that can be divided may be set to be equal to the length of the code that is set to identify the cell groups, and the length of the frame synchronization identification code may be smaller than the length of the cell group identification code due to the diversity gain.

FIG. 11 shows the formation of a frame 200 of downlink signals using a combination of codes that is formed by allocating different frame synchronization identification codes to the cell groups. In this case, the number of frame synchronization identification codes that are available in the cellular system is equal to the length of the codes. When the synchronization pattern is formed as shown in FIG. 11, the number of combinations of the cell group numbers and the frame synchronization identification codes increases since various frame synchronization identification codes are used. Therefore, as compared with the synchronization pattern shown in FIG. 10, it is possible to increase the number of cell groups that can be identified.

A base station and terminals share information on the combination of codes according to the exemplary embodiment of the present invention, and the terminals use the information to search cells.

Figure 12:
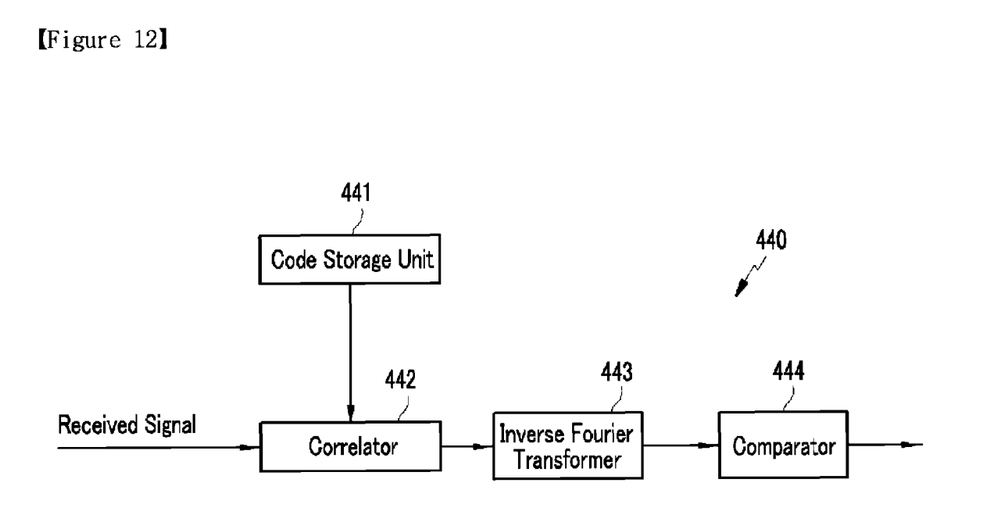
FIG. 12 is a block diagram schematically illustrating the configuration of a cell group estimator according to an exemplary embodiment of the present invention.

FIG. 12 is a block diagram schematically illustrating the cell group estimator 440 according to the exemplary embodiment of the present invention.

As shown in FIG. 12, the cell group estimator 440 according to the exemplary embodiment of the present invention includes a code storage unit 441, a correlator 442, an inverse Fourier transformer 443, and a comparator 444.

The code storage unit 441 stores orthogonal codes that are used as the cell group identification codes and the frame synchronization identification codes allocated to the synchronization channel symbol duration, and also stores information on the combination of codes forming the synchronization pattern. Meanwhile, when information on the cell including a terminal therein and peripheral cells (information on the cell number and the cell group) is known beforehand (that is, when the terminal is busy or in a standby state), the code storage unit 441 can extract a candidate combination of codes, and use the extracted combination of codes to search cells.

The correlator 442 receives the signals in the synchronization channel symbol duration that have been subjected to Fourier transform, and multiplies the signals having been subjected to Fourier transform by the conjugates of the orthogonal codes included in a combination of codes that are stored in the code storage unit 441.

That is, when the correlator 442 sequentially performs a conjugate operation on sequences in the synchronization channel section of the received downlink frame over the frequency domain, an operation for identifying a cell group and an operation for estimating frame synchronization are sequentially performed, which makes it possible to shorten the time to search cells.

The inverse Fourier transformer 443 performs inverse Fourier transform on a cell group identifying band and a frame synchronization identifying band among the signals output from the correlator 442 to generate time domain signals. In this case, the inverse Fourier transformer 443 may perform inverse fast Fourier transform (IFFT). The comparator 444 selects the maximum value from the time domain signals output from the inverse Fourier transformer 443, and extracts information on a combination of codes having the maximum value from the code storage unit 441, thereby identifying the cell group number and the frame synchronization. As can be seen from FIG. 10, as an example, when information on a combination of codes extracted by the comparator 444 is (1, 2), the current cell belongs to the cell group No. 1, and the terminal starts estimating the frame synchronization in the second synchronization block of the downlink frame. In this way, it is possible to estimate a frame start point.

Finally, the terminal estimates the cell number using scrambling information included in the pilot symbol duration. Since the terminal knows the cell group information, the terminal estimates the cell number on the basis of the scramble information of the cells belonging to the corresponding cell group. In this case, a general estimating method, such as a method of using the sum of powers of a set of subcarriers of the pilot symbol, may be used to estimate the cell number.

In this exemplary embodiment of the present invention, the cell number is estimated from the scrambling information of the pilot symbol duration, but the invention is not limited thereto. For example, the cell number may be estimated by using symbols in a common channel section including system information of a base station.

In addition, in this exemplary embodiment of the present invention, the cell group identification code is allocated to the synchronization pattern, but the invention is not limited thereto. Instead of the cell group identification code, a cell identification code may be allocated to one of two bands of the synchronization symbol duration to generate a downlink frame. In this case, the estimation of the cell number using the scramble code may be used to verify cell number information obtained from the synchronization pattern.

The constituent elements according to the exemplary embodiment of the present invention may be implemented by at least one hardware component composed of a programmable logic element, such as a DSP (digital signal process) processor, a controller, an ASIC (application specific integrated circuit), or a FPGA (field programmable gate array), other electronic devices, or a combination thereof. In addition, at least a portion of the function or procedure according to the exemplary embodiment of the present invention may be executed by software, and the software may be recorded on a recording medium. Further, the constituent elements, the function, and the procedure according to the exemplary embodiment of the present invention may be implemented by a combination of hardware and software.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, according to the exemplary embodiment of the present invention, it is possible to use a plurality of synchronization patterns formed in one frame to search a cell group and to estimate frame synchronization. In addition, it is possible to use the synchronization patterns to estimate sub-frame synchronization.

The invention claimed is:

1. A method for generating a downlink frame including a synchronization channel symbol duration, comprising:
   generating a synchronization pattern by combination of a first code and a second code, wherein the first code and the second code are codes for identifying a cell group number; and
   allocating the synchronization pattern to a frequency domain of the synchronization channel symbol duration to generate a synchronization signal,
   wherein the cell group number is determined based on the combination of the first code and the second code, and the cell group number is not determined based on only one of the first code and the second code,
   wherein the first and second codes are allocated to different subcarriers in the frequency domain, and
   wherein the synchronization channel symbol duration corresponds to one Orthogonal Frequency Division Multiplexing (OFDM) symbol duration.

2. The method of claim 1, wherein the first code is different from the second code.

3. The method of claim 1, wherein one downlink frame includes a plurality of synchronization channel symbol durations.

4. The method of claim 3, wherein a synchronization pattern included in a first synchronization channel symbol duration within a downlink frame duration is different from a synchronization pattern included in a second synchronization channel symbol duration within the same downlink frame duration.

5. The method of claim 1, wherein the first code is allocated to even-numbered subcarriers in the frequency domain, and the second code is allocated to odd-numbered subcarriers in the frequency domain.

6. The method of claim 1, wherein a length of the first code is identical to a length of the second code.

7. An apparatus for generating a downlink frame in a wireless communication system, comprising:
   a pattern generator for generating a synchronization pattern by combination of a first code and a second code, wherein the first code and the second code are codes for identifying a cell group number; and
   a mapping unit for mapping the synchronization pattern generated by the pattern generator to a frequency domain of a synchronization channel symbol duration of the downlink frame,
   wherein the cell group number is determined based on the combination of the first code and the second code, and the cell group number is not determined based on only one of the first code and the second code,
   wherein the first and second codes are allocated to different subcarriers in the frequency domain, and
   wherein the synchronization channel symbol duration corresponds to one Orthogonal Frequency Division Multiplexing (OFDM) symbol duration.

8. The apparatus of claim 7, wherein the first code is different from the second code.

9. The apparatus of claim 7, wherein the synchronization pattern is allocated to a synchronization channel symbol duration, wherein one downlink frame includes a plurality of synchronization channel symbol durations.

10. The apparatus of claim 9, wherein a synchronization pattern included in a first synchronization channel symbol duration within a downlink frame duration is different from a synchronization pattern included in a second synchronization channel symbol duration within the same downlink frame duration.

11. The apparatus of claim 7, wherein the first code is allocated to even-numbered subcarriers in the frequency domain, and the second code is allocated to odd-numbered subcarriers in the frequency domain.

12. The apparatus of claim 7, wherein a length of the first code is identical to a length of the second code.

13. A method for searching a cell, comprising:
   receiving an Orthogonal Frequency Division Multiplexing (OFDM) symbol including a synchronization pattern formed by combination of a first code and a second code, wherein the first code and the second code are codes for identifying a cell group number; and
   identifying the cell group number based on the combination of the first code and the second code, wherein the cell group number is not determined based on only one of the first code and the second code.

14. The method of claim 13, wherein the synchronization pattern is allocated in a synchronization channel symbol duration, and one frame includes a plurality of synchronization channel symbol durations.

15. The method of claim 13, wherein the first code is allocated to even-numbered subcarriers in the frequency domain, and the second code is allocated to odd-numbered subcarriers in the frequency domain.

16. An apparatus for searching a cell, comprising:
   a receiver for receiving an Orthogonal Frequency Division Multiplexing (OFDM) symbol including a synchronization pattern formed by combination of a first code and a second code, wherein the first code and the second code are codes for identifying a cell group number; and
   a cell group estimator for estimating the cell group number based on the combination of the first code and the second code, and the cell group number is not determined based on only one of the first code and the second code.

17. The apparatus of claim 16, wherein the synchronization pattern is allocated to a synchronization channel symbol duration, and one frame includes a plurality of synchronization channel symbol durations.

18. The apparatus of claim 16, wherein the first code is allocated to even-numbered subcarriers in the frequency domain, and the second code is allocated to odd-numbered subcarriers in the frequency domain.

19. A non-transitory computer-readable medium that stores a program that is executable by a computer to perform a method comprising:
   generating a synchronization pattern by combination of a first code and a second code, wherein the first code and the second code are codes for identifying a cell group number; and allocating the synchronization pattern to a frequency domain of a synchronization channel symbol duration to generate a synchronization signal, wherein the cell group number is determined based on the combination of the first code and the second code, and the cell group number is not determined based on only one of the first code and the second code, wherein the first and second codes are allocated to different subcarriers in the frequency domain, and wherein the synchronization channel symbol duration corresponds to one Orthogonal Frequency Division Multiplexing (OFDM) symbol duration.

20. The non-transitory computer-readable medium of claim 19, wherein the first code is different from the second code.

21. The non-transitory computer-readable medium of claim 19, wherein one frame includes a plurality of synchronization channel symbol durations.

22. The non-transitory computer-readable medium of claim 21, wherein a synchronization pattern included in a first synchronization channel symbol duration within a frame duration is different from a synchronization pattern included in a second synchronization channel symbol duration within the same frame duration.

* * * * *